United States Patent
Sakamoto et al.

(10) Patent No.: US 10,199,680 B2
(45) Date of Patent: Feb. 5, 2019

(54) ELECTRIC DEVICE

(71) Applicant: Nissan Motor Co., Ltd., Yokohama-Shi, Kanagawa (JP)

(72) Inventors: Kazuyuki Sakamoto, Kanagawa (JP); Manabu Nishijima, Kanagawa (JP); Yosuke Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 193 days.

(21) Appl. No.: 15/303,067

(22) PCT Filed: Apr. 10, 2015

(86) PCT No.: PCT/JP2015/061283
§ 371 (c)(1),
(2) Date: Oct. 10, 2016

(87) PCT Pub. No.: WO2015/156399
PCT Pub. Date: Oct. 15, 2015

(65) Prior Publication Data
US 2017/0170513 A1   Jun. 15, 2017

(30) Foreign Application Priority Data
Apr. 11, 2014  (JP) ................. 2014-082259

(51) Int. Cl.
*H01M 10/0525* (2010.01)
*H01M 10/0567* (2010.01)
(Continued)

(52) U.S. Cl.
CPC ....... *H01M 10/0525* (2013.01); *H01M 4/505* (2013.01); *H01M 4/525* (2013.01);
(Continued)

(58) Field of Classification Search
CPC ........ H01M 10/0525; H01M 10/0567; H01M 2220/20; H01M 4/505; H01M 4/525; H01M 4/587
See application file for complete search history.

(56) References Cited

U.S. PATENT DOCUMENTS 5,792,574 A * 8/1998 Mitate ................. H01M 4/525
429/218.1
2004/0043300 A1   3/2004 Utsugi et al.
(Continued)

FOREIGN PATENT DOCUMENTS

JP   H1125980 A   1/1999
JP   2002270245 A   9/2002
(Continued)

*Primary Examiner* — Carlos Barcena
(74) *Attorney, Agent, or Firm* — Young Basile Hanlon & MacFarlane, P.C.

(57) ABSTRACT

An electric device having a power generating element contains a positive electrode with a positive electrode active material formed on a surface of a positive electrode current collector, a negative electrode, and a separator containing an electrolyte. The positive electrode active material contains a lithium nickel-based composite oxide having a layered crystal structure capable of insertion and desorption of lithium ions, the composition represented by: $[Li_\alpha Ni_\beta]_{3a}[Ni_x Mn_{y-r} M_r CO_z]_{3b}O_2$, wherein M is at least one selected from the group consisting of Ti, Zr, Nb, W, P, Al, Mg, V, Ca, Sr, Cr, Fe, B, Ga, In, Si, Mo, Y, Sn, V, Cu, Ag, and Zn, and $x+y+z \leq 1$, $\beta \leq 0.032$, $0.9 \leq \alpha+\beta \leq 1.2$, $0<x<1$, $0<y<1$, $0<z<1$, and $0 \leq r \leq 0.3$, and the electrolyte has a cyclic sulfonic acid ester.

11 Claims, 2 Drawing Sheets

(51) Int. Cl.
  *H01M 4/587* (2010.01)
  *H01M 4/525* (2010.01)
  *H01M 4/505* (2010.01)

(52) U.S. Cl.
  CPC ....... *H01M 4/587* (2013.01); *H01M 10/0567* (2013.01); *H01M 2220/20* (2013.01); *Y02T 10/7011* (2013.01)

(56) References Cited

U.S. PATENT DOCUMENTS

| | | | |
|---|---|---|---|
| 2009/0142663 A1* | 6/2009 | Takeuchi | H01M 10/0567 429/188 |
| 2013/0236780 A1 | 9/2013 | Yokote et al. | |
| 2014/0058598 A1* | 2/2014 | Matsui | H01M 4/131 701/22 |
| 2015/0044513 A1 | 2/2015 | Endoh et al. | |
| 2015/0155555 A1 | 6/2015 | Yamamoto et al. | |

FOREIGN PATENT DOCUMENTS

| | | |
|---|---|---|
| JP | 2004281368 A | 10/2004 |
| JP | 2011054334 A | 3/2011 |
| KR | 20130142880 A | 12/2013 |
| WO | 2013100081 A1 | 7/2013 |
| WO | 2013145913 A1 | 10/2013 |
| WO | 2013172007 A1 | 11/2013 |
| WO | 2014021014 A1 | 2/2014 |

\* cited by examiner

ELECTRIC DEVICE

CROSS REFERENCE TO RELATED APPLICATION

This application claims priority to Japanese Patent Application No. 2014-082259, filed on Apr. 11, 2014, incorporated herein by reference.

TECHNICAL FIELD

The present invention relates to an electric device.

BACKGROUND

Currently, an electric device such as a non-aqueous electrolyte secondary battery including a lithium ion secondary battery, which is used for a mobile device such as a mobile phone, is available as a commercial product. Among those, the non-aqueous electrolyte secondary battery generally has a constitution that a positive electrode having a positive electrode active material or the like coated on a current collector and a negative electrode having a negative electrode active material or the like coated on a current collector are connected to each other via an electrolyte layer in which a non-aqueous electrolyte solution or a non-aqueous electrolyte gel is maintained within a separator. According to absorption and desorption of ions such as lithium ions on an electrode active material, charge and discharge reactions of a battery occur.

In recent years, it is desired to reduce the amount of carbon dioxide in order to cope with the global warming. As such, a non-aqueous electrolyte secondary battery having small environmental burden has been used not only for a mobile device or the like but also for a power source device of an electrically driven vehicle such as a hybrid vehicle (HEV), an electric vehicle (EV), and a fuel cell vehicle.

A non-aqueous electrolyte secondary battery which is hopefully to be applied for an electrically driven vehicle is required to have high output and high capacity. As a positive electrode active material which is used for a positive electrode of a non-aqueous electrolyte secondary battery for an electrically driven vehicle, a lithium cobalt composite oxide as a layered composite oxide has been already widely used as it enables obtainment of high voltage at 4 V level and also has high energy density. However, cobalt as a raw material of the composite oxide is a naturally limited resource with high price, and thus considering the possibility of having a highly increasing demand in future, it is unstable in terms of raw material supply. Furthermore, there is a possibility of having increased cost for the raw cobalt material. Accordingly, it is desired to have composite oxide having less cobalt content.

Like the lithium cobalt composite oxide, a lithium nickel composite oxide has a layered structure and it is relatively inexpensive compared to lithium cobalt composite oxide. Furthermore, it is comparable to the lithium cobalt composite oxide in terms of theoretical discharge capacity. From this point of view, it is expected that the lithium nickel composite oxide is used for constituting a battery with practically useful high capacity.

In a lithium ion secondary battery in which a composite oxide containing lithium and nickel (hereinbelow, also simply referred to as "lithium nickel-based composite oxide") like lithium nickel composite oxide is used as a positive electrode active material, charge and discharge is carried out according to desorption and insertion of lithium ions in the corresponding composite oxide.

Herein, in order to use a lithium ion secondary battery as a power source for driving a vehicle or the like, not only the high capacity but also the high output, which determines acceleration performance or the like, is required. Furthermore, to respond to a use for a long period of time, it is required for the battery to have a long service life. In response to such requirement, in JP 2011-54334 A, a technique of using in combination lithium transition metal composite oxide with layered crystal structure containing manganese and nickel which can insert and release lithium ion and lithium transition metal composite oxide of spinel crystal structure which contains manganese as a positive electrode active material is disclosed. Furthermore, according to the technique disclosed in JP 2011-54334 A, the aforementioned problem is to be solved by having 50% or more (in molar ratio) of the composition ratio of nickel relative to the transition metal element other than lithium that is contained in the lithium transition metal composite oxide of layered crystal structure.

SUMMARY

However, it was found out by the determinations made by the inventors of the present invention that, according to the technique disclosed in JP 2011-54334 A, a problem of a significantly reduced battery capacity in accordance with a progress of charge and discharge cycle (i.e., insufficient cycle durability) occurs when the electrolyte contains a cyclic sulfonic acid ester as an additive.

Accordingly, an object of the present invention is to provide a means, in an electric device such as a lithium ion secondary battery, whereby reduction in battery capacity as a charge and discharge cycle progresses can be suppressed (i.e., cycle durability can be improved), even if an electrolyte contains a cyclic sulfonic acid ester as an additive.

The inventors of the present invention conducted intensive studies. As a result, it was found that the aforementioned problem can be solved by using a lithium nickel-based composite oxide with specific composition (specifically, the amount of Ni diffused into Li layer is the same or lower than a pre-determined value) as a positive electrode active material. The present invention is completed accordingly.

Namely, according to one embodiment of the present invention, provided is an electric device having a power generating element containing a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator containing an electrolyte. Furthermore, the electric device is characterized in that the positive electrode active material contains a lithium nickel-based composite oxide having a layered crystal structure which is capable of insertion and desorption of lithium ions, having a composition represented by the general formula: $[Li_\alpha Ni_\beta]_{3a}[Ni_x Mn_{y-r} M_r Co_z]_{3b} O_2$ (provided that M is at least one selected from the group consisting of Ti, Zr, Nb, W, P, Al, Mg, V, Ca, Sr, Cr, Fe, B, Ga, In, Si, Mo, Y, Sn, V, Cu, Ag, and Zn, and $x+y+z \leq 1$, $\beta \leq 0.032$, $0.9 \leq \alpha+\beta \leq 1.2$, $0<x<1$, $0<y<1$, $0<z<1$, and $0 \leq r \leq 0.3$ are satisfied), and the electrolyte contains a cyclic sulfonic acid ester.

DETAILED DESCRIPTION OF THE EMBODIMENTS

Figure 1:
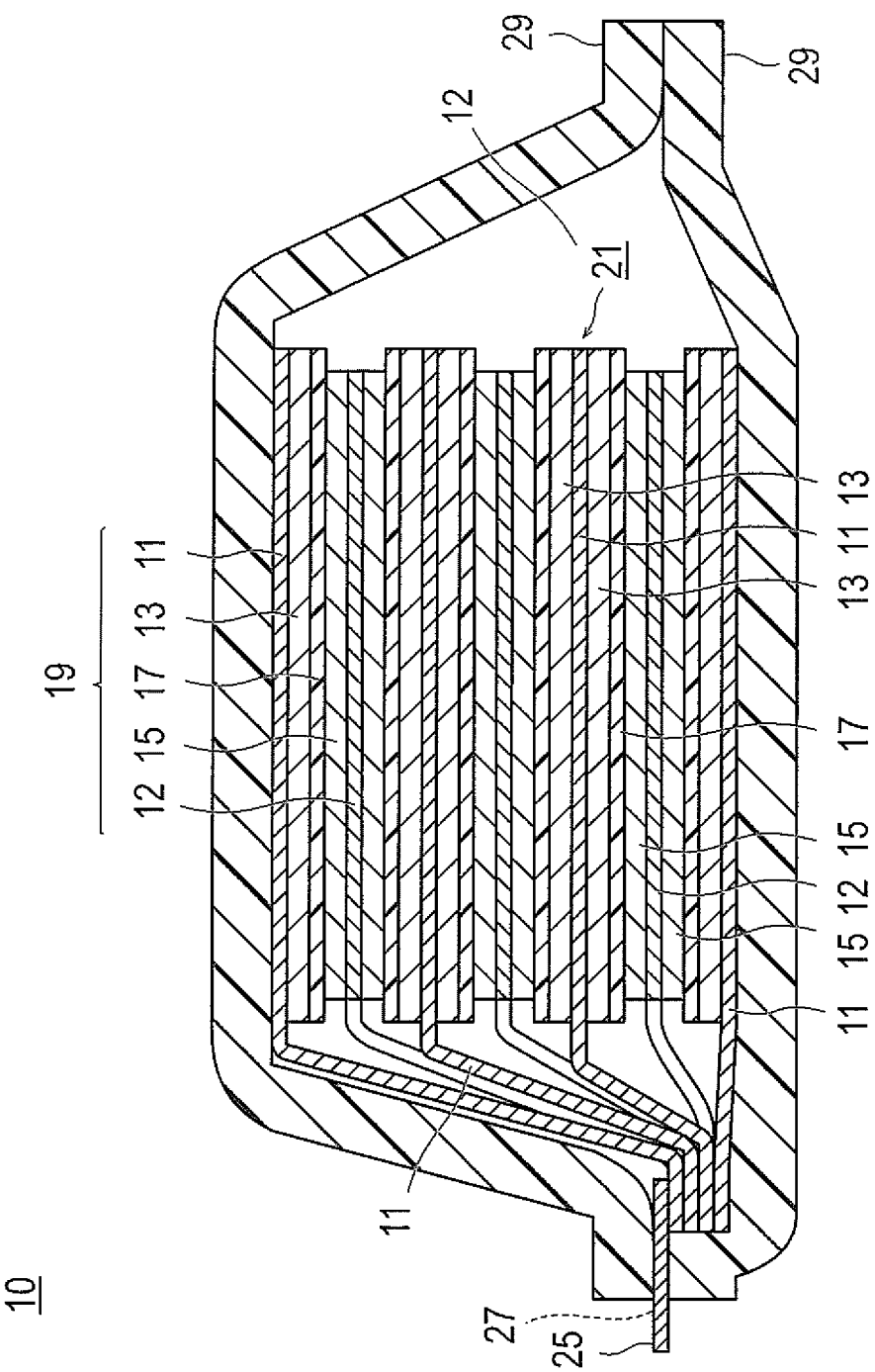
FIG. 1 is a brief cross-sectional view schematically illustrating the basic constitution of a non-aqueous electrolyte secondary battery as one embodiment of the battery of the present invention, and it is a brief cross-sectional view which is taken along the line A-A shown in FIG. 2.

According to one embodiment of the present invention, provided is an electric device having a power generating element containing a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator containing an electrolyte, wherein the positive electrode active material contains a lithium nickel-based composite oxide having a layered crystal structure which is capable of insertion and desorption of lithium ions, having a composition represented by the general formula: $[Li_\alpha Ni_\beta]_{3a}[Ni_x Mn_{y-r} M_r Co_z]_{3b} O_2$ (provided that M is at least one selected from the group consisting of Ti, Zr, Nb, W, P, Al, Mg, V, Ca, Sr, Cr, Fe, B, Ga, In, Si, Mo, Y, Sn, V, Cu, Ag, and Zn, and $x+y+z \leq 1$, $\beta \leq 0.032$, $0.9 \leq \alpha+\beta \leq 1.2$, $0<x<1$, $0<y<1$, $0<z<1$, and $0 \leq r \leq 0.3$ are satisfied), and the electrolyte contains a cyclic sulfonic acid ester. According to the electric device of the present invention, a disturbance in diffusion pathway of lithium ions, which is caused by adsorption of a cyclic sulfonic acid ester on Ni diffused into the Li layer, is suppressed by using the lithium nickel-based composite oxide with specific composition (specifically, the amount of Ni diffused into Li layer is the same or smaller than a pre-determined value) as a positive electrode active material. Accordingly, the diffusion of lithium ions can progress smoothly so that the reduction in battery capacity which occurs in accordance with a progress of charge and discharge cycle can be suppressed (i.e., cycle durability is improved).

Hereinbelow, embodiments of the present invention are described with reference to the attached drawings. Meanwhile, the same elements are given with the same symbols for the descriptions of the drawings, and overlapped descriptions are omitted. Further, note that dimensional ratios in the drawings are exaggerated for the sake of description, and they may be different from actual ratios in some cases.

[Non-Aqueous Electrolyte Secondary Battery]

FIG. 1 is a cross-sectional view schematically illustrating the brief constitution of a non-aqueous electrolyte secondary battery as one embodiment of the battery of the present invention. Meanwhile, detailed descriptions are given in the present specification for, as an example, a lithium ion secondary battery of a flat type (stack type) which is not a bipolar type illustrated in FIG. 1. However, it is evident that the technical scope of the present invention is not limited thereto.

First, the overall structure of the non-aqueous electrolyte secondary battery of the present invention is described by means of drawings.

[Overall Structure of Battery]

As illustrated in FIG. 1, a stack type battery 10 according to this embodiment has a structure in which a power generating element 21 with a substantially rectangular shape, in which a charge and discharge reaction actually occurs, is sealed inside of a battery outer casing material 29 as an outer casing body. Herein, the power generating element 21 has a constitution in which a positive electrode, a separator 17, and a negative electrode are stacked. Meanwhile, the separator 17 has a non-aqueous electrolyte (for example, liquid electrolyte) therein. The positive electrode has a structure in which the positive electrode active material layer 15 is disposed on both surfaces of the positive electrode current collector 12. The negative electrode has a structure in which the negative electrode active material layer 13 is disposed on both surfaces of the negative electrode current collector 11. Specifically, one positive electrode active material layer 15 and the neighboring negative electrode active material layer 13 are disposed to face each other via the separator 17, and a negative electrode, an electrolyte layer and a positive electrode are stacked in this order. Accordingly, the neighboring positive electrode, electrolyte layer and negative electrode form one single battery layer 19. As such, it can also be said that, as plural single battery layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the negative electrode active material layer 13 is disposed only on a single surface. However, an active material layer may be formed on both surfaces. Namely, not only a current collector exclusive for an outermost layer in which an active material layer is formed only on a single surface can be prepared but also a current collector having an active material layer on both surfaces can be directly used as a current collector of an outermost layer. Furthermore, by reversing the arrangement of the positive electrode and negative electrode of FIG. 1, it is also possible that the outer most layer positive electrode current collector is disposed on both outermost layers of the power generating element 21 and a positive electrode active material layer is disposed on a single surface of the outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to a terminal of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding, resistance welding or the like.

Meanwhile, although a stack type battery of flat type (stack type) which is not a bipolar type is illustrated in FIG. 1, it can also be a bipolar type battery containing a bipolar type electrode which has a positive electrode active material layer electrically bound to one surface of a current collector and a negative electrode active material layer electrically bound to the opposite surface of a current collector. In that case, one current collector plays both roles of a positive electrode current collector and a negative electrode current collector.

Hereinbelow, each member constituting one embodiment of the non-aqueous electrolyte lithium ion secondary battery of the present invention is described.

[Positive Electrode]

The positive electrode has a positive electrode current collector and a positive electrode active material layer that is formed on a surface of the positive electrode current collector.

(Positive Electrode Current Collector)

The material for constituting a positive electrode current collector is not particularly limited, but a metal is preferably used. Specific examples of the metal include aluminum, nickel, iron, stainless steel, titanium, copper, and other alloys. In addition to them, a clad material of nickel and aluminum, a clad material of copper and aluminum, or a plating material of a combination of those metals can be preferably used. It can also be a foil obtained by coating aluminum on a metal surface. Among them, from the viewpoint of electron conductivity or potential for operating a battery, aluminum, stainless steel, and copper are preferable.

The size of the current collector is determined based on use of a battery. When it is used for a large-size battery which requires high energy density, for example, a current collector with large area is used. Thickness of the current collector is not particularly limited, either. Thickness of the current collector is generally 1 to 100 μm or so.

(Positive Electrode Active Material Layer)

The positive electrode active material layer contains a positive electrode active material. In the present embodiment, the positive electrode active material essentially contains a lithium nickel-based composite oxide having a layered crystal structure which is capable of insertion and desorption of lithium ions, having a composition represented by the general formula: $[Li_\alpha Ni_\beta]_{3a}[Ni_x Mn_{y-r} M_r Co_z]_{3b} O_2$ (provided that M is at least one selected from the group consisting of Ti, Zr, Nb, W, P, Al, Mg, V, Ca, Sr, Cr, Fe, B, Ga, In, Si, Mo, Y, Sn, V, Cu, Ag, and Zn, and $x+y+z \leq 1$, $\beta \leq 0.032$, $0.9 \leq \alpha+\beta \leq 1.2$, $0<x<1$, $0<y<1$, $0<z<1$, and $0 \leq r \leq 0.3$ are satisfied).

The lithium nickel-based composite oxide described above is generally a lithium-nickel-manganese-cobalt composite oxide (hereinbelow, also simply referred to as "NMC composite oxide"). The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal and extractable Li amount is twice the amount of spinel type lithium manganese composite oxide, that is, as the supply power is two times higher, it can have high capacity. In addition, as having higher heat stability compared to $LiNiO_2$, it is particularly advantageous among the lithium nickel-based composite oxides that are used as a positive electrode active material.

As described herein, the lithium nickel-based composite oxide includes a composite oxide in which part of manganese element in the NMC composite oxide described above is replaced with another metal element. In that case, examples of another element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

From the viewpoint of improving the purity and enhancing electron conductivity of a material, nickel (Ni), cobalt (Co), and manganese (Mn) are generally known to contribute to the capacity and output characteristics. Ti or the like replaces part of the transition metal (Mn) in crystal lattice. From the viewpoint of the cycle characteristics, it is preferable that part of transition element is replaced with other metal element.

Herein, in the electric device according to the present embodiment, the electrolyte contains a cyclic sulfonic acid ester as an additive as it is described below. When the electrolyte contains a cyclic sulfonic acid ester as an additive, there is a problem that the cyclic sulfonic acid ester is adsorbed onto Ni diffused into Li layer so that the diffusion pathway of lithium ions is disturbed, if a lithium nickel-based composite oxide of a related art is used as a positive electrode active material. Furthermore, once the diffusion pathway of lithium ions is disturbed like the above, smooth diffusion of lithium ions is not obtained, and thus a problem occurs in that the battery capacity is significantly reduced in accordance with a progress of charge and discharge cycle.

On the other hand, according to this embodiment, by using the aforementioned lithium nickel-based composite oxide with specific composition (specifically, the amount of Ni diffused into Li layer is the same or smaller than a pre-determined value) as a positive electrode active material, a disturbance of diffusion pathway of lithium ions that is caused by adsorption of a cyclic sulfonic acid ester on Ni diffused in Li layer is suppressed. Accordingly, diffusion of lithium ions progresses smoothly, and thus the reduction in battery capacity which occurs in accordance with a progress of charge and discharge cycle can be suppressed (i.e., cycle durability can be improved). Specifically, it is characterized to have, in the general formula of the lithium nickel-based composite oxide described above, $\beta \leq 0.032$. This $\beta$ value is preferably 0.028 or less, more preferably 0.025 or less, and particularly preferably 0.020 or less. Meanwhile, although the lower limit of the $\beta$ value is not particularly limited, it is generally 0 or higher.

Furthermore, as described above, the above composition formula satisfies $x+y+z \leq 1$, $\beta \leq 0.032$, $0.9 \leq \alpha+\beta \leq 1.2$, $0<x<1$, $0<y<1$, $0<z<1$, and $0 \leq r \leq 0.3$. Herein, each of y and z preferably satisfies $0<y \leq 0.5$ and $0<z \leq 0.5$.

Herein, a preferred embodiment regarding the aforementioned specific composition includes a mode in which $x \leq 0.8$, a mode in which $y=z$, and a mode in which $y=\frac{2}{3}z$. As at least one of those requirements is further satisfied in the specific composition described above, an advantage of having excellent capacity characteristics and cycle durability can be obtained. Meanwhile, when those characteristics are expressed in other terms, a preferred embodiment of the aforementioned composition includes $LiNi_{0.5}Mn_{0.3}Co_{0.2}O_2$ and $LiNi_{0.8}Mn_{0.1}Co_{0.1}O_2$.

The lithium nickel-based composite oxide is a layered compound belonging to the space group R-3m, and as shown by the above composition formula, the crystal structure of this compound has plural sites. Herein, the "site" means a lattice position which is equivalent in terms of crystallography, and when any element is present on that lattice position, it is described that "the site is occupied" and such site is referred to as an occupied site. Specifically, the lithium nickel-based composite oxide has 3a site which is occupied by lithium and a trace amount of nickel and 3b site which is occupied by a metal element other than lithium (i.e., nickel, manganese, cobalt, aluminum, or the like).

According to the preferred embodiment, a preferred range of various parameters that are obtained by powder X-ray diffraction measurement of the lithium nickel-based composite oxide is defined. According to the adjustment for having the following parameters, it becomes possible to exhibit sufficiently the working effect of this embodiment.

A length of c-axis (i.e., c-axis length) as a lattice constant of a unit lattice of the above lithium nickel-based composite oxide obtained by powder X-ray diffraction measurement is preferably 14.280 Å or less, more preferably 14.215 Å or less, and even more preferably 14.210 Å or less. Furthermore, a ratio value (c/a) of the length of c-axis (i.e., c-axis length) relative to the length of a-axis (i.e., a-axis length) as the other lattice constant of the above unit lattice is preferably 4.969 or less, more preferably 4.946 or less, and even more preferably 4.940 or less.

Furthermore, according to other preferred embodiment, a ratio value (I (003/104)) of a peak intensity (I (003)) originating from the (003) surface relative to the peak intensity (I (104)) originating from the (104) surface of the lithium nickel-based composite oxide obtained by powder X-ray diffraction measurement is defined. Specifically, the ratio value (I (003/104)) is preferably 1.28 or more, more preferably 1.35 or more, and even more preferably 1.40 or more.

The lithium nickel-based composite oxide such as the NMC composite oxide can be produced by selecting various known methods such as a co-precipitation method and a spray drying method. From the viewpoint of having easy production of the composite oxide according to this embodiment, a co-precipitation method is preferably used. Specifically, with regard to a method for synthesizing the NMC composite oxide with the above-mentioned composition, production can be made by, for example, a method described in JP 2011-105588 Å in which a nickel-cobalt-manganese composite oxide is produced by the co-precipitation method and the nickel-cobalt-manganese composite oxide is admixed with a lithium compound followed by calcination. Specific descriptions are given for the case when the lithium nickel-based composite oxide is the NMC composite oxide, as an example.

Raw material compounds of a composite oxide, for example, a Ni compound, a Mn compound, or a Co compound, are dissolved in a suitable solvent such as water so as to have a desired composition of materials of an active material. Examples of the Ni compound, the Mn compound and the Co compound include sulfate, nitrate, carbonate, acetate, oxalate, oxide, hydroxide, and halide of the metal element. Specific examples of the Ni compound, the Mn compound and the Co compound include nickel sulfate, cobalt sulfate, manganese sulfate, nickel acetate, cobalt acetate, and manganese acetate, but not limited thereto. During the process, if necessary, in order to have a further desired composition of an active material, a compound containing at least one metal element such as Ti, Zr, Nb, W, P, Al, Mg, V, Ca, Sr, Cr, Fe, B, Ga, In, Si, Mo, Y, Sn, V, Cu, Ag, or Zn as a metal element for replacing part of the layered lithium metal composite oxide which forms the active material may be further incorporated.

A co-precipitation reaction can be performed by neutralization and precipitation reactions using the above raw material compounds and an alkali solution. Accordingly, metal composite hydroxide or metal composite carbonate containing the metal included in the above raw material compounds can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for neutralization reaction is sufficient to have the equivalent ratio of 1.0 to components to be neutralized which are contained in the whole metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation reaction is then preferably filtered by suction, washed with water, and dried. Meanwhile, by controlling the conditions for performing the co-precipitation reaction (for example, stirring time and alkali concentration), particle diameter of the composite hydroxide can be controlled, and it has an influence on the average particle diameter of the secondary particles of a positive electrode active material which is finally obtained.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate and lithium carbonate.

The calcination treatment can be performed by one step, but it is preferably performed by two steps (temporary calcination and main calcination). According to two-step calcination, a composite oxide can be obtained efficiently. The conditions for temporary calcination are not particularly limited, and they may vary depending on the lithium raw material, and thus cannot be unambiguously defined. Meanwhile, the temperature increase rate is preferably 1 to 20° C./minute from room temperature. Furthermore, the atmosphere is preferably either air or oxygen atmosphere. Here, when the NMC composite oxide is synthesized by using lithium carbonate as the Li raw material, temperature for temporary calcination is preferably 500 to 900° C., more preferably 600 to 800° C., and even more preferably 650 to 750° C. Furthermore, time for temporary calcination is preferably 0.5 to 10 hours and more preferably 4 to 6 hours. Meanwhile, as for the conditions for main calcination, the temperature increase rate is preferably 1 to 20° C./minute from room temperature, although it is not particularly limited thereto. Furthermore, the atmosphere is preferably either air or oxygen atmosphere. Here, when the NMC composite oxide is synthesized by using lithium carbonate as the Li raw material, temperature for calcination is preferably 800 to 1200° C., more preferably 850 to 1100° C., and even more preferably 900 to 1050° C. Furthermore, time for temporary calcination is preferably 1 to 20 hours and more preferably 8 to 12 hours.

Meanwhile, to produce the composite oxide satisfying the β value (β≤0.032), which is a characteristic constitution of the lithium nickel-based composite oxide according to this embodiment, it is sufficient that the atmosphere or temperature lowering rate during temperature lowering process after calcination in the calcination step (in case of two-step calcination, temporary calcination and/or main calcination)

is adjusted. Specifically, by increasing the oxygen concentration in the atmosphere during temperature lowering process after calcination, it becomes possible to lower the β value of the lithium nickel-based composite oxide to be obtained. Similarly, by lowering the temperature lowering rate during the temperature lowering process after calcination, it becomes possible to lower the β value of the lithium nickel-based composite oxide to be obtained. Furthermore, by performing the same adjustment as above during the temperature lowering process, a preferred embodiment of various parameters that are obtained by the aforementioned powder X-ray diffraction measurement can be achieved.

When a tiny amount of a metal element for replacing part of the layered lithium metal composite oxide forming materials of an active material is added as needed, any means such as mixing it in advance with nickel, cobalt, manganate salt, adding it simultaneously with nickel, cobalt, manganate salt, adding it to a reaction solution during the reaction, or adding it to the nickel-cobalt-manganese composite oxide with a Li compound can be employed.

The lithium nickel-based composite oxide can be produced by suitably controlling the reaction conditions such as pH of a reaction solution, reaction temperature, reaction concentration, speed for addition, and stirring time.

Meanwhile, it is needless to say that the positive electrode active material layer may contain other positive electrode active material which functions as an active material in the positive electrode. Examples of such other positive electrode active material include a lithium-transition metal composite oxide such as spinel type manganese positive electrode active material ($LiMn_2O_4$), $LiCoO_2$, $LiNiO_2$, or a composite oxide in which part of those transition metals is replaced with other element, a lithium-transition metal phosphoric acid compound, and a lithium-transition metal sulfuric acid compound. Meanwhile, content of the lithium nickel-based composite oxide with the specific composition described above is preferably 80 to 100% by weight, more preferably 95 to 100% by weight, and even more preferably 100% by weight, relative to 100% by weight of the material which can function as a positive electrode active material contained in the positive electrode active material layer.

Meanwhile, another preferred embodiment includes a mode in which spinel type manganese positive electrode active material ($LiMn_2O_4$) is additionally contained as a positive electrode active material, in addition to the lithium nickel-based composite oxide with the specific composition as described above. By having such constitution, it becomes possible to further suppress an increase in internal resistance of a battery.

From the viewpoint of having high output, the average particle diameter of a positive electrode active material is, although not particularly limited, preferably 6 to 11 μm, and more preferably 7 to 10 jam in terms of the secondary particle diameter. Furthermore, the average particle diameter of the primary particle is 0.4 to 0.65 μm, and more preferably 0.45 to 0.55 μm. Meanwhile, note that "particle diameter" described in the present specification means a maximum distance L among distances, each of which is a distance between arbitrary two points on outlines of a particle. Furthermore, as for the value of "average particle diameter" described herein, employed is a value which is calculated as a mean value of particle diameters of particles observed in several to several tens of visual fields by using an observing means such as a scanning electron microscope (SEM) or a transmission electron microscope (TEM).

If necessary, the positive electrode active material layer further contains, in addition to the aforementioned positive electrode active material, other additives such as a conductive aid, a binder, an electrolyte (for example, polymer matrix, ion conductive polymer, and electrolyte solution), and lithium salt for enhancing ion conductivity. However, the content of a material capable of functioning as an active material in the positive electrode active material layer and the negative electrode active material layer described below is preferably 85 to 99.5% by weight.

(Binder)

A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), an epoxy resin, and the like. These binders may be each used singly, or two or more thereof may be used in combination.

The amount of the binder contained in the positive electrode active material layer is not particularly limited as long as the binder can bind the active material. The amount of binder is preferably 0.5 to 15% by weight, more preferably 1 to 10% by weight with respect to the active material layer.

If necessary, the positive electrode active material layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active material layer or negative electrode active material layer. Examples of the conductive aid include carbon materials such as carbon black including ketjen black and acetylene black; and carbon fiber. When the active material layer contains a conductive aid, an electron network in the inside of the active material layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the positive electrode active material layer and negative electrode active material layer described below is not particularly limited. The blending ratio can be adjusted by suitably referring to the already-known knowledge about a lithium ion secondary battery. The thickness of each active material layer is not particularly limited either, and reference can be made to the already-known knowledge about a battery. For example, the thickness of each active material layer is about 2 to 100 μm.

[Negative Electrode Active Material Layer]

The negative electrode active material layer contains an active material, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active material layer.

Examples of the negative electrode active material include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active material may be used in combination. Preferably, from the viewpoint of capacity and output characteristics, a carbon material or a lithium-transition metal composite oxide (among those, a carbon material, and particularly preferably graphite) is used as a negative electrode active material. Meanwhile, it is needless to say that a negative electrode active material other than those described above can be also used.

The average particle diameter of a negative electrode active material is, although not particularly limited, preferably 1 to 100 μm, and more preferably 1 to 20 μm from the viewpoint of having high output.

The negative electrode active material layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetate copolymer, styrene-acrylic copolymer or the like), acrylonitrile-butadiene rubber, methyl methacrylate-butadiene rubber, (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphazene, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, or a salt thereof, or the like), polyvinylpyrrolidone, polyacrylic acid (salt), polyethylene gylcol, a copolymer of (meth)acrylamide and/or (meth)acrylic acid salt [a (meth)acrylamide polymer, a (meth)acrylamide-(meth) acrylic acid salt copolymer, a (meth) acrylic acid alkyl (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, or a salt thereof, or the like), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 0.5 to 2.

In a binder used for the negative electrode active material layer, the content of the aqueous binder is preferably 80 to 100% by weight, preferably 90 to 100% by weight, and preferably 100% by weight.

[Separator (Electrolyte Layer)]

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven fabric separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyvinylidenefluoride-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), a fuel cell vehicle (FCV) or the like, it is preferably 4 to 60 µm as a monolayer or a multilayer. Fine pore diameter of the microporous (microporous membrane) separator is preferably 1 µm or less at most (in general, the pore diameter is about several tens of nanometers).

As a non-woven fabric separator, conventionally known ones such as cotton, rayon, acetate, nylon, polyester; polyolefin such as PP and PE; polyimide and aramid are used either singly or as a mixture. Furthermore, the bulk density of a non-woven fabric is not particularly limited as long as sufficient battery characteristics are obtained with an impregnated polymer gel electrolyte. Furthermore, it is sufficient that the thickness of the non-woven fabric separator is the same as that of an electrolyte layer. Preferably, it is 5 to 200 µm. Particularly preferably, it is 10 to 100 µm.

Further, as described above, the separator contains an electrolyte. The electric device according to this embodiment is characterized in that the electrolyte contains a cyclic sulfonic acid ester as an additive. As the electrolyte contains a cyclic sulfonic acid ester as an additive, the cycle durability of the electric device can be improved. In the present invention, in particular, there is an advantage that the cycle durability is improved as dissolution of Mn atom from the aforementioned positive electrode active material is suppressed due to the presence of a cyclic sulfonic acid ester. Specific constitution of the cyclic sulfonic acid ester is not particularly limited, and a reference can be made to conventionally known knowledge. Examples of the cyclic sulfonic acid ester include 1,3-propane sultone, 1,3-propene sultone, and methylene methane disulfonic acid ester (methylene methane disulfonate). In addition, those described in JP 2010-219011 A can be also similarly used.

Meanwhile, the electrolyte may further contain an additive in addition to the cyclic sulfonic acid ester that is described above. Specific examples of the additive include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The electrolyte is not particularly limited if it can exhibit the function as a lithium ion carrier, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has the form in which a lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethyl methyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethylmethacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are more preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, a laminate film consisting aluminate is more preferred for an outer casing body.

[Cell Size]

Figure 2:
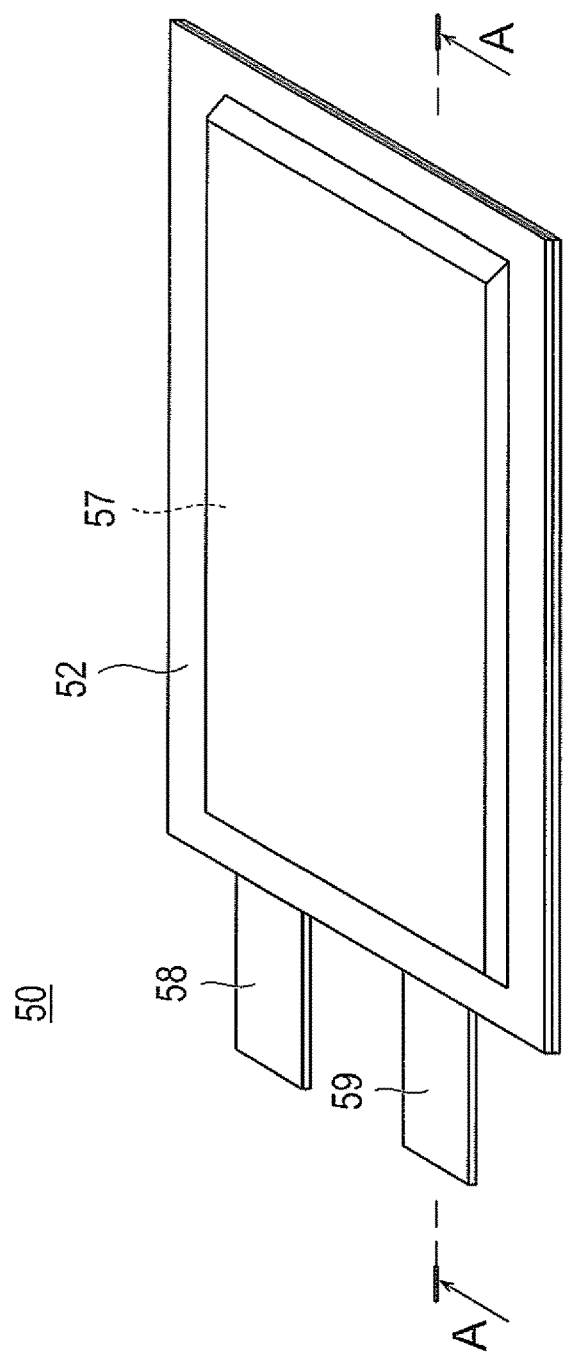
FIG. 2 is a perspective view illustrating the appearance of a flat type non-aqueous electrolyte secondary battery as a representative embodiment of the battery of the present invention.

FIG. 2 is a perspective view illustrating the appearance of a flat non-aqueous electrolyte secondary battery as a representative embodiment of a secondary battery. According to a preferred embodiment of the present invention, like this non-aqueous electrolyte secondary battery, a flat stack type laminate battery having a constitution that the power generating element is enclosed in a battery outer casing body which is formed of a laminate film containing aluminum is provided.

As illustrated in FIG. 2, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 1 as described above. In the power generating element 57, plural single battery layers (single cell) 19, which are each formed of the positive electrode (positive electrode active material layer) 15, the electrolyte layer 17 and the negative electrode (negative electrode active material layer) 13, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 2 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 2. Furthermore, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is about 50% in general. The cell loading efficiency for this space is a factor of determining the cruising distance of an electric vehicle. As the size of a single cell decreases, the loading efficiency is lowered, and thus it becomes impossible to maintain the cruising distance.

Thus, in the present invention, the battery structure of which power generating element is covered with an outer casing body preferably has a large size. Specifically, length of short side of a laminate cell battery is preferably 100 mm or more. Such large-size battery can be used for an automobile. Herein, the length of short side of a laminate cell battery indicates the length of a shortest side. The upper limit of a length of a short side is, although not particularly limited, generally 400 mm or less.

[Volume Energy Density and Rated Discharge Capacity]

According to the market requirement, a typical electric vehicle needs to have driving distance (cruising distance) of 100 km or more per single charge. Considering such cruising distance, the volume energy density of a battery is preferably 157 Wh/L or more and the rated capacity is preferably 20 Wh or more.

Herein, with regard to the non-aqueous electrolyte secondary battery in which the positive electrode of this embodiment is used, largeness of a battery is determined in view of a relationship between battery area or battery capacity, from the viewpoint of a large-sized battery, which is different from a physical size of an electrode. Specifically, the non-aqueous electrolyte secondary battery of this embodiment is a flat stack type laminate battery, in which a ratio value of a battery area (projected area of a battery including a battery outer casing body) to rated capacity is 5 cm$^2$/Ah or more, and the rated capacity is 3 Ah or more. Thus, with a battery with large area and large capacity, the problem of a reduction in battery capacity as a charge and discharge cycle progresses as described above can be more significant. Meanwhile, in a conventional battery for everyday household use, which has no large area or large capacity, such a problem is hardly actualized.

Furthermore, an aspect ratio of a rectangular electrode is preferably 1 to 3, and more preferably 1 to 2. Meanwhile, the aspect ratio of an electrode is defined by a longitudinal/transversal ratio of a positive electrode active material layer with a rectangular shape. By having the aspect ratio in this range, an advantage of having both the performances required for a vehicle and loading space can be obtained.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell vehicle, or a hybrid fuel cell vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptible power source device.

Hereinbelow, more detailed explanations are given in view of Examples and Comparative Examples. However, it is evident that the present invention is not limited to the Examples given below.

Example 1

(1) Preparation of NMC Composite Oxide

As a positive electrode active material, NMC composite oxide (LiNi$_{0.80}$Mn$_{0.10}$Co$_{0.10}$O$_2$) was prepared according to a method conventionally known in the field. At that time, in order to have $\beta=0.032$ when the composition of the obtained NMC composite oxide is set to satisfy the general formula ($[Li_\alpha Ni_\beta]_{3a}[Ni_x Mn_{y-r} M_r Co_z]_{3b} O_2$) according to the present invention, the oxygen concentration in the atmosphere and temperature lowering rate during temperature lowering process of the calcination step (temporary calcination and main calcination) were adjusted.

Furthermore, as a result of measuring the c-axis length by powder X-ray diffraction measurement of the obtained NMC composite oxide, it was found to be 14.280 [Å] and the c/a value was 4.969. Furthermore, as a result of measuring the (I (003/104)), it was found to be 1.28. For the powder X-ray diffraction measurement, the X-ray diffraction measurement device using Cu-Kα ray (manufactured by Rigaku Corporation) was used, and the analysis was performed by employing the Fundamental Parameter. By using the X-ray diffraction pattern which has been obtained from the range of diffraction angle 2θ=15 to 120° and using Topas Version 3, which is software of analysis, the analysis was performed. The crystal structure belongs to hexagonal crystal with space group R-3m, and by assuming that the 3a site thereof is occupied by Li, the 3b site is occupied by M (Ni, Co, Mn, Al, or the like) and excess Li portion x, and the 6c site is occupied by O, the crystallite diameter (Gauss) and crystal deformation (Gauss) were obtained. Meanwhile, by assuming that the isotropic temperature factor (Beq) is 1, the refinement was carried out until Rwp<10.0 and GOF<1.3. As for the procedures for refinement, Beq was set at 1 (Beq=1), while the z coordinate of oxygen and site occupancy, crystallite diameter (Gauss), and the bonding distance between sites are taken as variables, and the refinement was repeatedly carried out until each variable does not vary.

(2) Production of Positive Electrode

90% by weight of the positive electrode active material which has been obtained from (1), 5% by weight of ketjen black (average particle diameter: 300 nm) as a conductive aid, 5% by weight of polyvinylidene fluoride (PVDF) as a binder, and a suitable amount of N-methyl-2-pyrrolidone (NMP) as a solvent for controlling slurry viscosity were admixed with one another to prepare a slurry of positive electrode active material. Then, a surface of an aluminum foil (thickness: 20 μm) as a current collector was coated with the obtained slurry of positive electrode active material, dried for 3 minutes at 120° C., and subjected to press molding using a roll press machine to produce a positive electrode which has coating amount of 18 mg/cm² for single surface of a positive electrode active material layer.

(3) Production of Negative Electrode

Natural graphite was used as a negative electrode active material. 96.5% by mass of the negative electrode active material, and 1.5% by mass of ammonium salt of carboxy methyl cellulose and 2.0% by mass of styrene-butadiene copolymer latex as a binder were dispersed in purified water to produce slurry of negative electrode active material.

Then, a copper foil to be a negative electrode current collector was coated with this slurry of negative electrode active material, dried for 3 minutes at 120° C., and subjected to press molding using a roll press machine to produce a negative electrode which has a negative electrode active material layer (length: 225 mm, width: 205 mm, thickness: 60 μm) on both surfaces of a negative electrode current collector. At that time, weight of the negative electrode active material per unit area was 9 mg/cm² and the density was 1.5 g/cm³.

(4) Production of Laminate Battery

By alternately laminating the obtained positive electrode and the negative electrode obtained from above (i.e., 3 layers of the positive electrode and 4 layers of the negative electrode), each via the separator (polypropylene microporous membrane, length: 230 mm, width: 210 mm, thickness: 25 μm), a laminate was produced. To the positive electrode and negative electrode of the laminate, a tab (i.e., current collecting plate) was soldered and stored in an outer casing material which is composed of an aluminum laminate film. After that, a pre-determined amount of a non-aqueous electrolyte solution was added thereto followed by sealing to produce a laminate battery which has length of 275 mm, width of 230 mm, and thickness of 7 mm. As an electrolyte solution, one obtained by adding methylene methane disulfonic acid ester, which is a cyclic sulfonic acid ester, as an additive, at a concentration of 2% by weight, to a solution in which 1.0 M $LiPF_6$ was dissolved in a mixed solvent of ethylene carbonate (EC) and dimethyl carbonate (DMC) (volume ratio of 1:1), was used.

Example 2

NMC composite oxide ($LiNi_{0.80}Mn_{0.10}Co_{0.10}O_2$) was prepared in the same manner as Example 1 described above except that, regarding the above (1) Preparation of NMC composite oxide, the oxygen concentration in the atmosphere and temperature lowering rate during temperature lowering process of the calcination step (temporary calcination and main calcination) were adjusted so as to have $\beta=0.025$ when the composition of the obtained NMC composite oxide is set to satisfy the general formula ($[Li_\alpha Ni_\beta]_{3a}[Ni_x Mn_{y-r} M_r Co_z]_{3b} O_2$) according to the present invention. Then, a positive electrode containing the NMC composite oxide as a positive electrode active material and a laminate battery were produced.

Furthermore, the c-axis length was measured for the obtained NMC composite oxide by powder X-ray diffraction measurement. As a result, the c-axis length was 14.220 [Å] and the c/a value was 4.965. Furthermore, as a result of measuring the I (003/104), it was found to be 1.35.

Example 3

NMC composite oxide ($LiNi_{0.80}Mn_{0.10}Co_{0.10}O_2$) was prepared in the same manner as Example 1 described above except that, regarding the above (1) Preparation of NMC composite oxide, the oxygen concentration in the atmosphere and temperature lowering rate during temperature lowering process of the calcination step (temporary calcination and main calcination) were adjusted so as to have $\beta=0.020$ when the composition of the obtained NMC composite oxide is set to satisfy the general formula ($[Li_\alpha Ni_\beta]_{3a}[Ni_x Mn_{y-r} M_r Co_z]_{3b} O_2$) according to the present invention. Then, a positive electrode containing the NMC composite oxide as a positive electrode active material and a laminate battery were produced.

Furthermore, the c-axis length was measured for the obtained NMC composite oxide by powder X-ray diffraction measurement. As a result, the c-axis length was 14.210 [Å] and the c/a value was 4.940. Furthermore, as a result of measuring the I (003/104), it was found to be 1.40.

Comparative Example 1

NMC composite oxide ($LiNi_{0.80}Mn_{0.10}Co_{0.10}O_2$) was prepared in the same manner as Example 1 described above except that, regarding the above (1) Preparation of NMC composite oxide, the oxygen concentration in the atmosphere and temperature lowering rate during temperature lowering process of the calcination step (temporary calcination and main calcination) were adjusted so as to have $\beta=0.035$ when the composition of the obtained NMC composite oxide is set to satisfy the general formula ($[Li_\alpha Ni_\beta]_{3a}[Ni_x Mn_{y-r} M_r Co_z]_{3b} O_2$) according to the invention. Then, a positive electrode containing the NMC composite oxide as a positive electrode active material and a laminate battery were produced.

Furthermore, the c-axis length was measured for the obtained NMC composite oxide by powder X-ray diffraction measurement. As a result, the c-axis length was 14.280 [Å] and the c/a value was 4.969. Furthermore, as a result of measuring the I (003/104), it was found to be 1.26.

Comparative Example 2

NMC composite oxide ($LiNi_{0.80}Mn_{0.10}Co_{0.10}O_2$) was prepared, and a positive electrode containing the NMC composite oxide as a positive electrode active material and a laminate battery were produced in the same manner as Comparative Example 1 described above, except that no cyclic sulfonic acid ester was added to the electrolyte solution.

[Evaluation of Cycle Durability (Capacity Retention Rate)]

After sufficient aging period (i.e., after open circuit voltage is stabilized), the laminate battery which has been produced in each of Examples 1 to 3 and Comparative Examples 1 and 2 was charged at 25° C. with a rate of 1 C until the voltage of 4.15 V, and the initial charge capacity was obtained. Subsequently, the battery was rested for 1 hour and then discharged at a rate of 1 C to 3.0 V, and the capacity at that time was used as initial discharge capacity. Furthermore, after repeating this charge and discharge cycle 500 times, the capacity retention rate was obtained and evaluated as an indicator of cycle durability. The results are shown in the following Table 1.

TABLE 1

| | | Comparative Example 1 | Comparative Example 2 | Example 1 | Example 2 | Example 3 |
|---|---|---|---|---|---|---|
| Positive electrode | β | 0.035 | 0.035 | 0.032 | 0.025 | 0.020 |
| | c-axis length (Å) | 14.280 | 14.280 | 14.280 | 14.220 | 14.210 |
| | c/a | 4.969 | 4.969 | 4.969 | 4.965 | 4.940 |
| | I(003/104) | 1.26 | 1.26 | 1.28 | 1.35 | 1.40 |
| Additive (cyclic sulfonic acid ester) (% by weight) | | 2 | None | 2 | 2 | 2 |
| Capacity retention rate (%) | | 68 | 85 | 88 | 90 | 92 |

From the above results, it was found that for the lithium ion secondary batteries of Examples 1 to 3 in which the positive electrode according to the present invention is used, a reduction in battery capacity as a charge and discharge cycle progresses can be suppressed even if the electrolyte contains a cyclic sulfonic acid ester as an additive.

On the other hand, from Comparative Example 1 in which the electrolyte contains a cyclic sulfonic acid ester as an additive but a positive electrode active material not satisfying the requirement of the present invention is used, a significant reduction in capacity retention rate was observed.

Meanwhile, from the results of Comparative Example 2, a reduction in capacity retention rate was not observed at such level even when the same positive electrode active material as Comparative Example 1 is used, if the electrolyte does not contain a cyclic sulfonic acid ester as an additive.

Based on this, it was found that the effect of improving the cycle durability based on the characteristic constitution of the present invention, i.e., using a lithium nickel-based composite oxide with the β value of pre-determined value or less as a positive electrode active material, is significantly exhibited in particular when the electrolyte contains a cyclic sulfonic acid ester as an additive.

REFERENCE SIGNS LIST 10, 50: Lithium ion secondary battery
11: Negative electrode current collector
12: Positive electrode current collector
13: Negative electrode active material layer
15: Positive electrode active material layer
17: Separator
19: Single battery layer
21, 57: Power generating element
25: Negative electrode current collecting plate
27: Positive electrode current collecting plate
29, 52: Battery outer casing material
58: Positive electrode tab
59: Negative electrode tab

The invention claimed is:

1. A lithium ion secondary battery comprising a power generating element comprising:
   a positive electrode in which a positive electrode active material layer containing a positive electrode active material is formed on a surface of a positive electrode current collector,
   a negative electrode in which a negative electrode active material layer containing a negative electrode active material is formed on a surface of a negative electrode current collector, and
   a separator containing an electrolyte,
   wherein the positive electrode active material comprises a lithium nickel-based composite oxide having a layered crystal structure which is capable of insertion and desorption of lithium ions, having a composition represented by the general formula: $[Li_\alpha Ni_\beta]_{3a}[Ni_x Mn_{y-r} M_r Co_z]_{3b} O_2$ wherein M is at least one selected from the group consisting of Ti, Zr, Nb, W, P, Al, Mg, V, Ca, Sr, Cr, Fe, B, Ga, In, Si, Mo, Y, Sn, Cu, Ag, and Zn, and $x+y+z \leq 1$, $0.020 \leq \beta \leq 0.032$, $0.9 \leq \alpha+\beta \leq 1.2$, $0<x<1$, $0<y<1$, $0<z<1$, and $0 \leq r \leq 0.3$, and
   the electrolyte comprises a cyclic sulfonic acid ester.

2. The lithium ion secondary battery according to claim 1, wherein a length of c-axis of the lithium nickel-based composite oxide obtained by powder X-ray diffraction measurement is 14.280 Å or less, and a ratio value (c/a) of the length of c-axis relative to the length of a-axis is 4.969 or less.

3. The lithium ion secondary battery according to claim 2, wherein the length of c-axis of the lithium nickel-based composite oxide obtained by powder X-ray diffraction measurement is 14.215 Å or less, and the ratio value (c/a) of the length of c-axis relative to the length of a-axis is 4.946 or less.

4. The lithium ion secondary battery according to claim 1, wherein a ratio value (I (003/104)) of a peak intensity (I (003)) originating from the (003) surface relative to the peak intensity (I (104)) originating from the (104) surface of the lithium nickel-based composite oxide obtained by powder X-ray diffraction measurement is 1.28 or more.

5. The lithium ion secondary battery according to claim 1, wherein the positive electrode active material further comprises a spinel type manganese positive electrode active material.

6. The lithium ion secondary battery according to claim 1, wherein the negative electrode active material comprises graphite.

7. The lithium ion secondary battery according to claim 1, wherein $x \leq 0.8$, $y=z$, or $y=\frac{2}{3}z$.

8. The lithium ion secondary battery according to claim 1, wherein a ratio value of a battery area (projected area of the battery including a battery outer casing body) to rated capacity is 5 cm$^2$/Ah or more and the rated capacity is 3 Ah or more.

9. The lithium ion secondary battery according to claim 1, wherein an aspect ratio of an electrode defined as a longitudinal/transversal ratio of a rectangular positive electrode active material layer is 1 to 3.

10. The lithium ion secondary battery according to claim 1, wherein $\beta \leq 0.025$ is further satisfied in the general formula.

11. The lithium ion secondary battery according to claim 1, wherein the lithium nickel-based composite oxide having the layered crystal structure is a lithium-nickel-manganese-cobalt composite oxide having the layered crystal structure.

* * * * *